(12) United States Patent
Jury

(10) Patent No.: US 9,928,872 B1
(45) Date of Patent: Mar. 27, 2018

(54) DATA RECOVERY USING A MULTI-READER HEAD

(71) Applicant: Seagate Technology LLC, Cupertino, CA (US)

(72) Inventor: Jason Charles Jury, Apple Valley, MN (US)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 15/674,727

(22) Filed: Aug. 11, 2017

(51) Int. Cl.
*G11B 5/09* (2006.01)
*G11B 21/02* (2006.01)
*G11B 21/03* (2006.01)
*G11B 20/12* (2006.01)

(52) U.S. Cl.
CPC .............. *G11B 21/03* (2013.01); *G11B 20/12* (2013.01)

(58) Field of Classification Search
CPC . G11B 20/10009; G11B 5/09; G11B 2220/90; G11B 27/36; G11B 5/012; G11B 5/00; G11B 5/6005; G11B 5/59633; G11B 5/54; G11B 5/58; G11B 5/584
USPC ....................... 360/31, 39, 53, 55, 77.01, 75
See application file for complete search history.

(56) References Cited

U.S. PATENT DOCUMENTS

| 6,157,510 | A | 12/2000 | Schreck et al. |
|---|---|---|---|
| 6,421,197 | B1 | 7/2002 | Abdelnour |
| 6,510,017 | B1 | 1/2003 | Abdelnour |
| 6,754,030 | B2 | 6/2004 | Seng et al. |
| 7,602,575 | B1 | 10/2009 | Lifchits et al. |
| 8,589,774 | B1* | 11/2013 | Song ................. H03M 13/4138 360/54 |
| 8,964,325 | B1 | 2/2015 | Yamada |
| 9,147,431 | B2 | 9/2015 | Lammers et al. |
| 9,401,161 | B1 | 7/2016 | Jury et al. |
| 9,418,688 | B1 | 8/2016 | Rausch et al. |
| 2007/0230026 | A1 | 10/2007 | Takaishi |
| 2012/0206830 | A1 | 8/2012 | Gao et al. |
| 2014/0192435 | A1 | 7/2014 | Buch |

* cited by examiner

*Primary Examiner* — Nabil Hindi
(74) *Attorney, Agent, or Firm* — Westman, Champlin & Koehler, P.A.

(57) ABSTRACT

In a method, read signals from each of a plurality of read transducers of a data head are buffered for each of a plurality of cross-track positions of the head relative to a data track. The buffered read signals are processed to establish a quality metric for each of the read signals and at least one combination read signal comprising at least two of the read signals. A data recovery cross-track position and a reader configuration comprising one or more of the read transducers are identified based on the quality metrics. A data read operation is then performed with the data head in the data recovery cross-track position using the read signals from the identified reader configuration.

20 Claims, 6 Drawing Sheets

US 9,928,872 B1

DATA RECOVERY USING A MULTI-READER HEAD

BACKGROUND

Data storage devices, such as disc drives, are used to store digital data to a recording medium. Occasionally, read errors are encountered when attempting to read data from a selected data track of a disc medium. Read error recovery operations can be performed to attempt to recover the desired data.

SUMMARY

Embodiments of the present disclosure generally relate to methods and devices for performing a data recovery operation using a data head having multiple read transducers. In one exemplary embodiment of the method, read signals from each of a plurality of read transducers of a data head are buffered for each of a plurality of cross-track positions of the head relative to a data track. The buffered read signals are processed to establish a quality metric for each of the read signals and at least one combination read signal comprising at least two of the read signals. A data recovery cross-track position and a reader configuration comprising one or more of the read transducers are identified based on the quality metrics. A data read operation is then performed with the data head in the data recovery cross-track position using the read signals from the identified reader configuration.

One embodiment of the device includes a recording medium comprising a plurality of data tracks, a data head comprising a plurality of read transducers, and processing circuitry. The processing circuitry is configured to buffer a read signal from each of the read transducers for each of a plurality of cross-track positions of the head relative to a selected data track, process the buffered read signals to establish a quality metric for each of the read signals and at least one combination read signal that includes at least two of the read signals, identify data recovery cross-track position and a reader configuration comprising one or more of the read transducers based on the quality metrics, and perform a data read operation with the head in the data recovery cross-track position using the read signals from the identified reader configuration.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
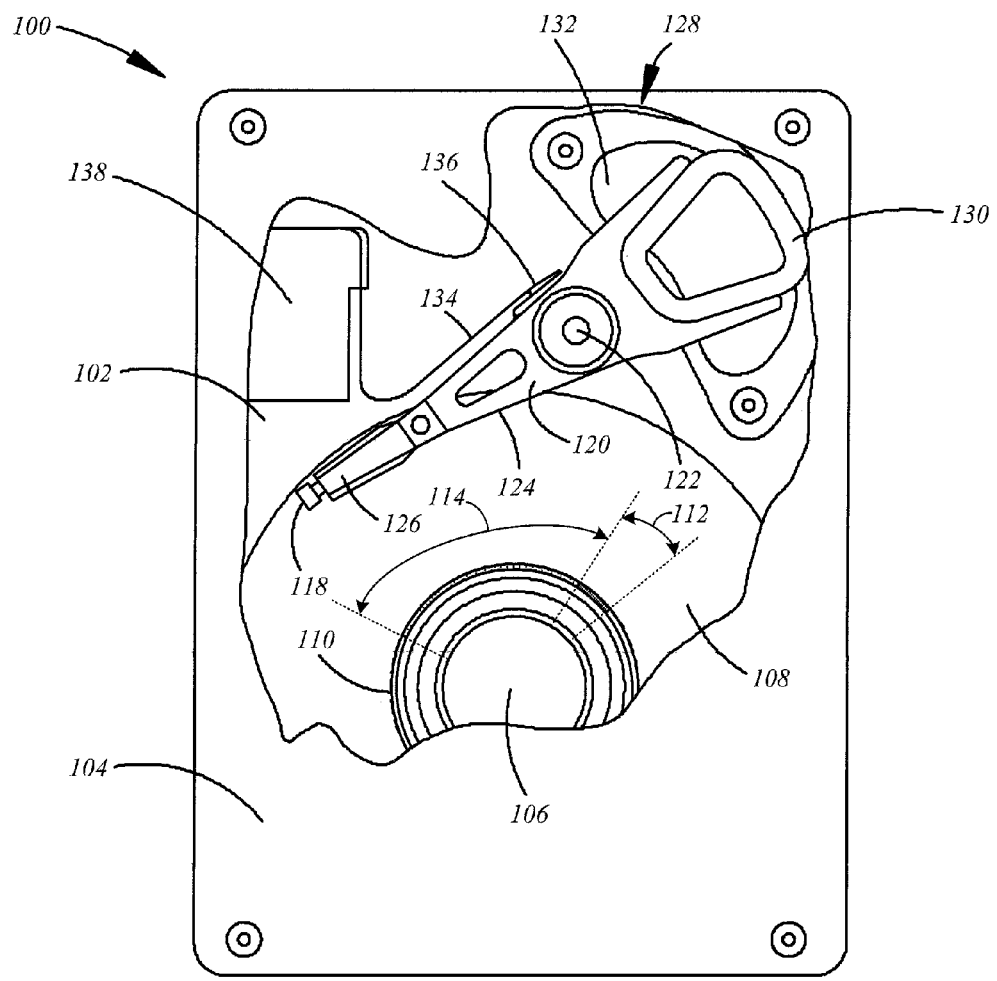
FIG. 1 is a top view of an exemplary data storage device, in which embodiments of the present disclosure may be implemented.

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

Data storage devices store and retrieve computerized data in a fast and efficient manner. Some data storage devices, such as hard disc drives (HDDs) store data in the form of tracks on one or more rotatable data storage media (e.g., discs). A data read transducer (e.g., sensor) can be positioned adjacent the tracks using an actuator assembly to read back data stored to the media.

A continuing trend in the industry is to provide data storage devices with ever higher data storage capacities and areal data densities. Higher data densities may be achieved using technologies such as heat assisted magnetic recording (HAM) and bit patterned media (BPM). The use of multiple read transducers on a head has also been shown to be an effective way to improve data density.

Higher data densities raise a number of challenges with regard to accurately decoding stored data from tracks, particularly in high track density environments where track misregistration (TMR) can reduce the ability of the transducers to be maintained adjacent the tracks within requisite tolerances. As a result, data may be written at an offset from a track center, resulting in errors when attempting to read back the data. When such read errors occur, a read error recovery operation may commence to attempt to recover the desired data.

Embodiments of the present disclosure are generally directed to methods and devices for using multiple read transducers supported by a head to decode a data pattern, such as during an error recovery operation. As explained below, read signals from the multiple read transducers are processed individually and in combination for multiple offset cross-track positions of the head relative to a selected track to determine the best offset position for the individual and/or combined read transducers for recovering the desired data.

FIG. 1 is a top view of an exemplary data storage device 100 in the form of a disc drive, in which embodiments of the present disclosure may be implemented. The device 100 includes a base 102 to which various components of the device 100 are mounted. A top cover 104, shown partially cut away, cooperates with the base 102 to form an internal, sealed environment for the disc drive. The components include a spindle motor 106 that rotates one or more data discs 108.

The data discs 108 include a recording structure. In an exemplary embodiment, the recording structure includes a number of concentric data tracks 110. When configured with radial servo burst sectors 112, each disc track 110 is divided into slices called data wedges or sectors 114 between the servo burst sectors 112, in accordance with conventional data discs 108. The servo burst sectors 112, which are positioned at predetermined angularly spaced locations around the disc 108, include servo data that assists in correctly locating the head 118 over the tracks 110, and provide timing signals used to read the recorded data in the data sectors 114. The number of data sectors 114 contained on a particular track 110 depends, in part, on the length (e.g., circumference) of the track 110. Besides containing data recorded by the host system 140 (e.g., user data), each data sector 114 may also include other data to help identify and process the user data, for example.

Information is written to and read from tracks on the discs 108 through the use of an actuator assembly 120, which rotates during a seek operation about a bearing shaft assembly 122 positioned adjacent the discs 108. The actuator assembly 120 includes a plurality of actuator arms 124 that extend toward the discs 108, with one or more flexures 126 extending from each of the actuator arms 124. Mounted at the distal end of each of the flexures 126 is the head 118 that includes an air bearing slider enabling the head 118 to fly in close proximity above the corresponding surface of the associated disc 108.

During a seek operation, the track position of the heads 118 may be controlled through the use of a voice coil motor (VCM) 128, which typically includes a coil 130 attached to the actuator assembly 120, as well as one or more permanent magnets 132 that establish a magnetic field in which the coil 130 is immersed. The controlled application of current to the coil 130 causes magnetic interaction between the permanent magnets 132 and the coil 130, so that the coil 130 moves in accordance with the well-known Lorentz relationship to pivot the actuator assembly 120 about the bearing shaft assembly 122, and move the heads 118 across the surfaces of the discs 108.

A flex assembly 134 provides the requisite electrical connection paths for the actuator assembly 120, while allowing pivotal movement of the actuator assembly 120 during operation. The flex assembly 134 may include a printed circuit board 136 to which head wires (not shown) are connected; the head wires being routed along the actuator arms 124 and the flexures 126 to the heads 118. The printed circuit board 136 typically includes processing circuitry for controlling write currents to the heads 118 during write operations and for amplifying read signals generated by the read transducers of the heads 118 during read operations. The flex assembly 134 terminates at a flex bracket 138 for communication through the base deck 102 to a disc drive printed circuit board (not shown) mounted to the bottom side of the device 100.

Figure 2:
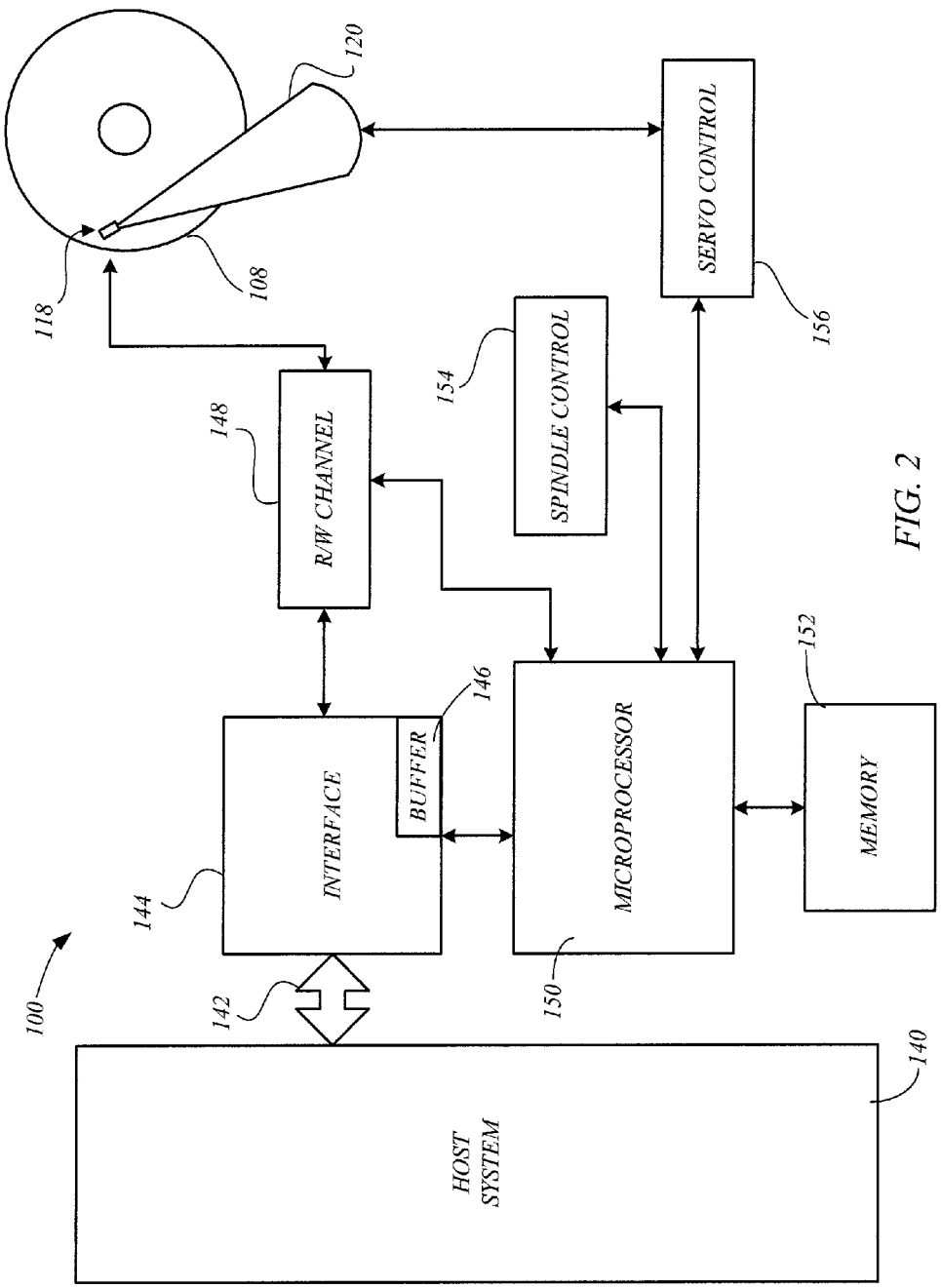
FIG. 2 is an exemplary functional block diagram of an exemplary data storage device, in accordance with embodiments of the present disclosure.

FIG. 2 is a functional block diagram of the exemplary data storage device 100 of FIG. 1, and generally shows the exemplary processing circuitry for controlling the operation of the device 100, which may be resident, for example, on a disc drive printed circuit board. A host system 140 may be operably connected 142 to an interface 144, such as an application specific integrated circuit. The interface 144 typically includes one or more associated buffers 146 that facilitates high speed data transfer between the host system 140 and the device 100.

Each buffer 146 may be a cache memory for caching commands and/or data to reduce disc access time, and include volatile and non-volatile memory. Data to be written to the device 100 are passed from the host system 140 to the interface 144 and then to a read/write channel 148, which encodes and serializes the data, and provides the requisite write current signals to write transducers of the heads 118. To retrieve data that has been previously stored by the device 100, read signals generated by one or more of the read transducers of the heads 118 are provided to the read/write channel 148, which performs decoding, error detection and correction operations, and outputs the retrieved data to the interface 144 for subsequent transfer to the host system 140.

As also shown in FIG. 2, a microprocessor 150 is operably connected to the interface 144. The microprocessor 150 provides top level communication and control for the device 100 in conjunction with programming for the microprocessor 150, which may be stored in a non-volatile memory 152 that is accessible by the microprocessor 150. The memory 152 may include random access memory (RAM), read only memory (ROM), and/or other sources of resident memory for the microprocessor 150. Additionally, the microprocessor 150 provides control signals for a spindle control 154, which controls the spindle motor 106 (FIG. 1), and a servo control system 156, which controls the currents to the VCM 128.

As the disc 108 rotates, the data head 118 reads the servo information containing an address within the servo bursts 112 (FIG. 1), and sends the servo information back to servo control system 156. The servo control system 156 checks whether the address in the servo information read from burst sectors 112 (FIG. 1) corresponds to the desired track location for the head 118. If the address does not correspond to the desired head location, the servo control system 156 adjusts the position of the head 118 to the correct track location.

Figure 3:
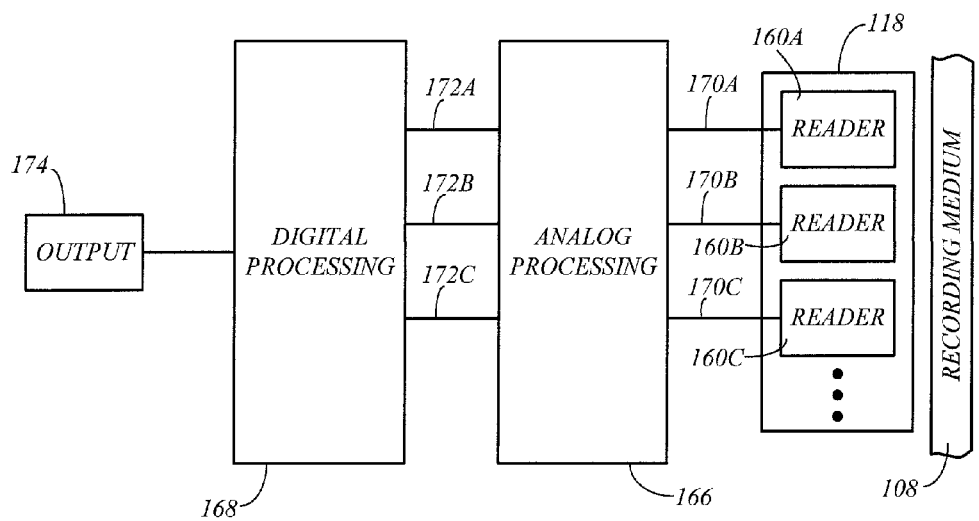
FIG. 3 is a block diagram illustrating an exemplary multi-reader head and processing circuitry, in accordance with exemplary embodiments of the present disclosure.

FIG. 3 is a block diagram illustrating an exemplary head 118 having multiple read transducers, generally referred to as 160, and processing circuitry, in accordance with exemplary embodiments of the present disclosure. Two or more read transducers 160, such as read transducers 160A, 160B and 160C, are configured to read data from a magnetic recording medium 108. It will be understood that a different number of read transducers 160 than what is shown may be used, such as, for example two, four, etc. The read transducers 160 are located at different positions on the head 118.

The read transducers 160 may include magnetoresistive transducers, such as giant magnetoresistance (GMR) sensor, tunneling magnetoresistance (TMR) sensor, or another suitable sensor. Generally, these types of transducers include layers of magnetic and non-magnetic materials that change resistance in response to local magnetic fields. A current is passed through the sensor while the media moves underneath. The resulting signal is used to read bits of data from the tracks 110 of the recording medium 108. A number of parameters in the construction and/or operation of the read transducers 160 can be varied to provide signal diversity.

Figure 4:
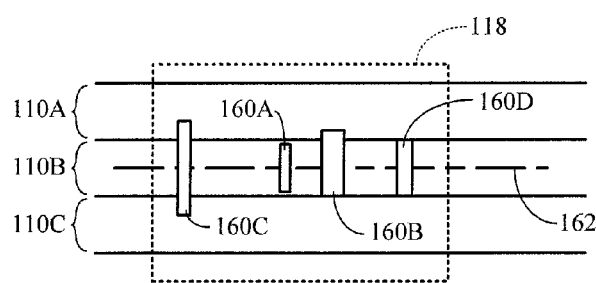
FIG. 4 is a simplified block diagram of an exemplary multi-reader head, in accordance with embodiments of the present disclosure.

FIG. 4 is a simplified block diagram of an exemplary head 118, which may be carried by a slider, supporting multiple read transducers 160, over exemplary tracks 110A-C of a recording medium 108. The read transducers 160 may each have any combination of the characteristics described herein. The read transducers 160 are arranged on the head 118 such that they may be substantially positioned over a single track when reading data from the track. The read transducers 160 may have different construction parameters that result in signal diversity. For example, at least two of the read transducers 160 may have different cross-track widths, shield-to-shield spacing, stack construction (e.g., layer thickness, layer arrangement, layer materials), stack type, head-to-media spacing, etc. that result in different performance parameters. Examples of the different performance parameters may include down-track resolution, cross-track coverage, adjacent track interference, signal amplitude, signal-to-noise ratio, frequency response, rise/fall time, reliability, endurance, impedance, etc. Generally, the construction and performance parameters result in one of the read transducers 160 having better performance under some conditions, and others of the read transducers 160 having better performance under other conditions.

As mentioned above, the read transducers 160 may differ by cross-track width, such as illustrated by read transducers 160A and 160B, for example. The read transducers 160 may also have different cross-track alignment relative to the center 162 of a target track, such as track 110B. Transducers 160A and 160C are roughly aligned with the center of the track 110B, and transducer 160B is offset from the track center.

The transducers 160 may also have different cross-track widths. For example, the transducers 160 may include a transducer having a cross-track width that is less than the width of the track 110B, such as illustrated by transducer 160A, a transducer having a cross-track width that is greater than the width of the track 110B, such as illustrated by transducers 160B and 160C, and/or a transducer having a cross-track width that is substantially equal to the cross-track width, such as illustrated by transducer 160D.

The transducers 160 may also have different down-track thickness (e.g., shield-to-shield spacing), which may result in a different read resolution for the individual transducers 160. For example, the transducers 160 may include transducers having a relatively large down-track thickness, such as illustrated by transducer 160B, and transducers having a relatively small down-track thickness, such as illustrated by transducer 160A.

Referring again to FIG. 3, the processing circuitry of the storage device 100 may include analog processing circuitry 166 and digital processing circuitry 168. Each of the read transducers 160 are coupled to the analog processing circuitry 166 via signal lines 170, such as lines 170A-C. The analog processing circuitry 166 may include components such as preamplifiers, filters, attenuators, delay elements, etc., that form the read/write channel 148 (FIG. 2) and process the read signals from each of the read transducers 160 separately. Output lines 172, such as output lines 172A-C of the analog processing circuitry 166, are input to the digital processing circuitry 168. The digital processing circuitry 168 may include components such as analog-to-digital decoders, digital signal processors and filters, buffers, error correction, digital delay, general-purpose programmable processors, etc., such as, for example, the interface 144, the microprocessor 150, the buffers 146, the spindle control 154, and the servo control system 156, shown in FIG. 2. The digital processing circuitry 168 may be configured for one or both of multiple sensor magnetic recording (MSMR) decoding/processing, and two-dimensional magnetic recording (TDMR) decoding/processing. In some embodiments, the analog signals delivered over lines 170 from the corresponding transducers 160 may be delivered individually or combined to form a digital output signal 174. The combining may occur either in the analog processing circuitry 166 or the digital processing circuitry 168.

Some embodiments of the present disclosure are directed to read error recovery methods that are performed by the processing circuitry of a data storage device 100 to read data from a data track of a recording medium following the detection of errors in reading the data during a read operation. The processing circuitry may comprise one or more of the components described above including at least one processor (e.g., microprocessor 150) that is configured to execute instructions stored in a non-transitory computer-readable medium (e.g., memory 152) to perform one or more functions or method steps described herein.

Figure 5:
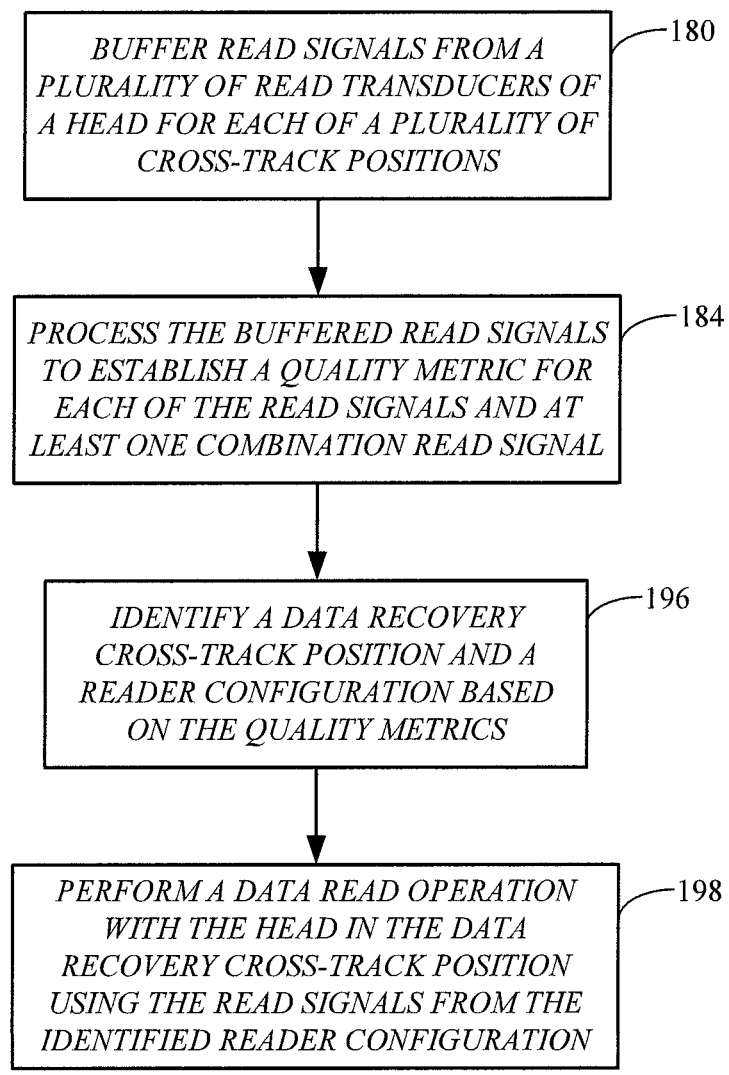
FIG. 5 is a flowchart illustrating a read error recovery method in accordance with embodiments of the present disclosure.

FIG. 5 is a flowchart illustrating a read error recovery method in accordance with embodiments of the present disclosure. Embodiments of the method will also be described with reference to FIGS. 6 and 7, which respectively are a simplified block diagram illustrating exemplary cross-track positions of a data head relative to a selected track, and a block diagram of exemplary processing circuitry configured to implement steps of the method.

At 180 of the method, read signals from a plurality of read transducers 160 of a data head 118 are buffered for each of a plurality of cross-track positions relative to the selected track. In this step of the method, the read signals are acquired at different cross-track positions to determine a cross-track position and reader configuration that is best suited to successfully read (e.g., recover) the desired data from the data track.

Figure 6:
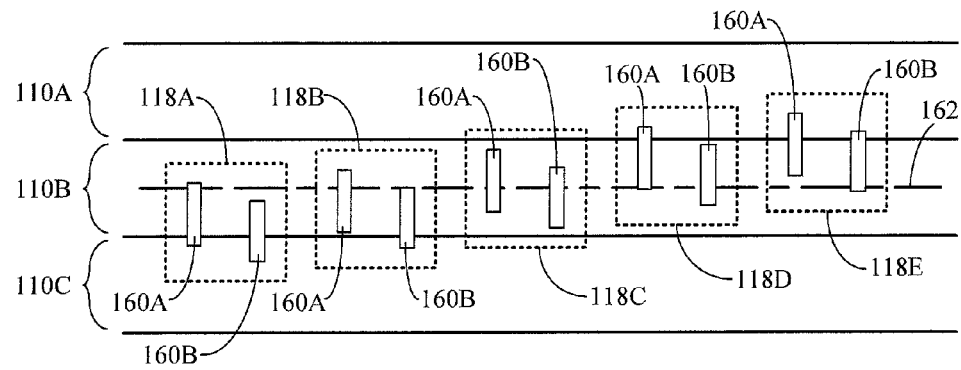
FIG. 6 illustrates exemplary cross-track positions of a data head relative to a selected track, in accordance with embodiments of the present disclosure.

In some embodiments, the multi-reader head 118 is positioned at various offset cross-track positions relative to the center line 162 of a track 110B containing the data that is to be recovered, as shown in FIG. 6, using the processing circuitry (e.g., microprocessor 150 and servo control system 156). Exemplary offset cross-track positions for the head 118 include −35% offset, −30% offset, −25% offset (e.g., head 118A), −20% offset, −15% offset (e.g., head 118B), −10% offset, −5% offset, 0% offset (e.g., head 118C), +5% offset, +10% offset, +15% offset (e.g., head 118D), +20% offset, +25% offset (e.g., head 118E), +30% offset, and/or +35% offset. It is understood that these offsets are merely exemplary and that embodiments of the present disclosure include selecting fewer, more, and different offset cross-track positions for the head 118 to determine the best offset position for recovering the desired data in the track 110B.

Figure 7:
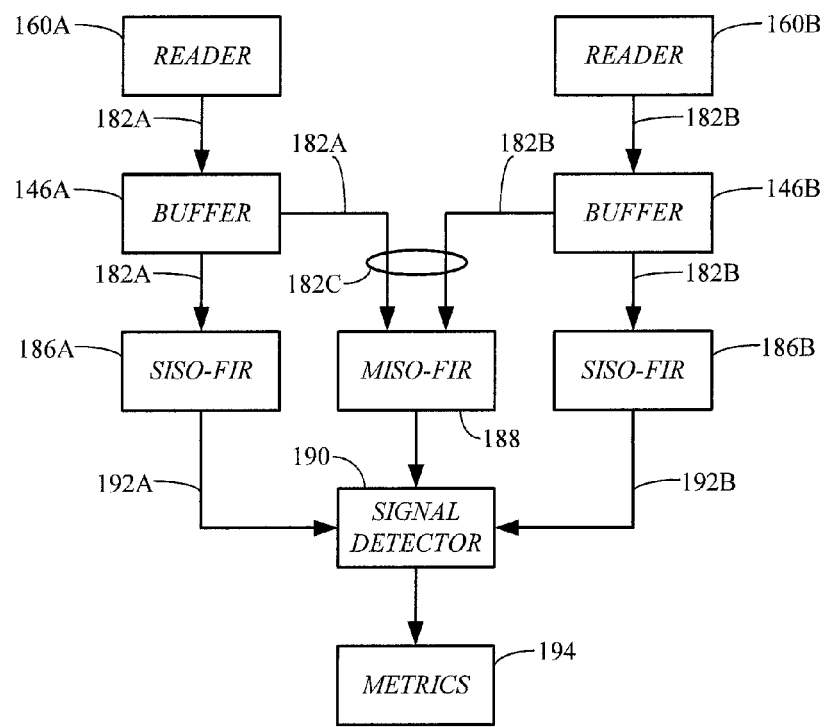
FIG. 7 is a block diagram of exemplary processing circuitry configured to implement steps of the method.

In the illustrated example of FIG. 6, the data head 118 includes read transducers or readers 160A and 160B. However, as explained above, the data head 118 may include more than two read transducers 160. The data head 118 is initially positioned at a cross-track position relative to the center line of the selected track, such as illustrated by head 118A that is positioned at approximately −25% offset (FIG. 6), and the read signals 182A and 182B from the read transducers 160A and 160B are buffered using the processing circuitry of the storage device, such as using buffers 146A and 146B, as shown in FIG. 7. The read signals 182A and 182B correspond to the output from the read transducers 162A and 162B while positioned over the data sector 114 of the track 110B containing the data to be recovered.

The position of the data head 118 may then be moved to another cross-track position (e.g., −15% offset) relative to the track 110B. Another read operation may then commence, during which the read signals from the read transducers 160A and 160B are stored in the buffers 146A and 146B. These steps can be repeated for each of a plurality of cross-track positions for the data head 118.

At 184 of the method, the buffered read signals are processed to establish a quality metric for each of the read signals 182A and 182B, and at least one combination read signal 182C. The combination read signal 182C includes the read signals 182 of two or more of the read transducers 160 of the data head 118. For the exemplary data head 118, the combination read signal 182C is based on both of the read signals 162A and 162B from the read transducers 160A and 160B.

In some embodiments, this processing of the buffered read signals 182 is performed by the processing circuitry of the device 100 while the multi-reader head 118 is positioned over sectors of the track 110B other than the data sector 114 containing the desired data to be recovered. For example, the processing circuitry may buffer a set of read signals 182 from the read transducers 160 of the multi-reader head 118 while the head 118 is held at a selected offset cross-track position and the head is over the targeted data sector, then process the read signals 182 to establish the quality metrics for the read signals while the head 118 is positioned over other sectors of the track 110B, such as servo sectors 112. This processing may occur immediately following the buffering of the read signals. Accordingly, while the method steps 180 and 184 are illustrated separately in FIG. 5, it is understood that the steps may be combined where a set of the read signals 182 are buffered and processed before and/or during movement of the head 118 to the next cross-track position and buffering and processing the next set of read signals 182.

The processing circuitry analyzes the individual and combination read signals, such as read signals 182A, 182B and 182C, to establish the quality metrics using any suitable techniques. Exemplary quality metrics include a bit error rate, signal-to-noise ratio, and/or another suitable quality metric that can be used to gauge the quality of the individual and combination read back signals 182 for recovering the desired data from the track 110B.

In some embodiments, the processing circuitry includes Single-Input, Single-Output (SISO) finite-input response (FIR) filters 186A and 186B for processing the individual read signals 182A and 182B, respectively, and a Multiple-Input, Single-Output (MISO) FIR 188 for processing the combination read signal 182C. In some embodiments, the SISO FIRs 186 and the MISO FIR 188 are trained using the read signals 182. The SISO FIR 186 and the MISO-FIR 188 may each adapt to minimize the mean-square error between the FIR output and some target signal, using an algorithm like least-mean-square (LMS).

In some embodiments, the processing circuitry includes a signal detector 190 that receives the outputs 192A and 192B from the SISO FIR filters 186 and the MISO FIR filter 188, and processes the outputs 192A and 192B to determine the quality metrics 194 for the individual and combination read signals, as indicated in FIG. 7. The signal detector 190 may take the form of a soft-output Viterbi algorithm (SOVA), a Baal-Cocke-Jelinek-Raviv (BJCR) detector, or another suitable signal detector.

At 196 of the method, a data recovery cross-track position for the data head and a reader configuration are identified based on the quality metrics 194. The data recovery cross-track position of the data head corresponds to a position relative to the selected data track that has been determined to have the greatest likelihood of recovering the desired data using the reader configuration. For example, when the metric is the bit error rate, a mean square error may be determined and used to evaluate the quality of the readback signals and the cross-track position of the head. The reader configuration identifies one or more of the read transducers whose read signals will be used to obtain the desired data while the data head is in the data recovery cross-track position. In some embodiments, the metrics 194 output from the signal detector 190 are evaluated for the individual and combination read signals for each of the cross-track offset positions of the head 118 by the processing circuitry to determine the data recovery cross-track position and reader configuration.

Figure 8:
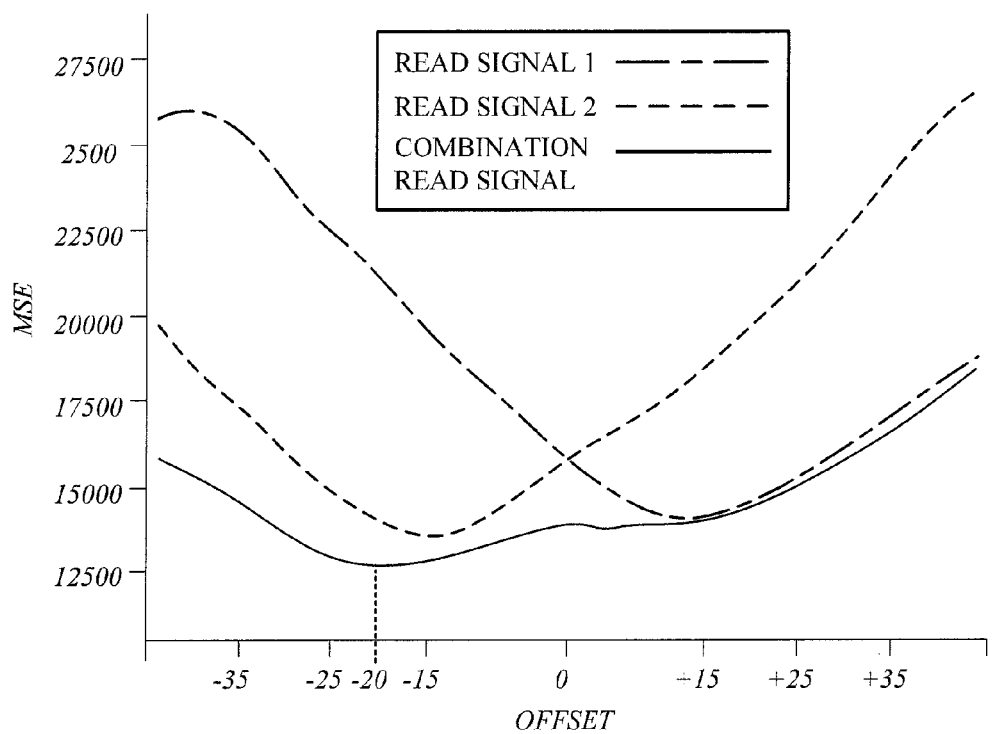
FIG. 8 is a chart of mean-square errors (MSE) of exemplary read signals generated by a pair of read transducers, taken individually and in combination, at different offset cross-track positions.

FIG. 8 is a chart of mean-square errors of exemplary read signals generated by a pair of read transducers, taken individually and in combination, at different offset cross-track positions. As shown in FIG. 8, the lowest mean-square error, which indicates the highest quality readback signal, is achieved by the exemplary combination read signal with the data head at approximately −20% offset. Thus, for this example, the data recovery cross-track position for the head would be selected as −20% offset, and the reader configuration would be set to include both of the read transducers resulting in the use of the combination read signal.

With the data recovery cross-track position and the reader configuration established, a read operation may be performed to recover the desired data in the track 110B, as indicated at 198 of the method. This generally involves positioning the data head 118 in the data recovery cross-track position, then performing a data read operation by processing the read signals from the one or more read transducers of the identified reader configuration in accordance with a conventional read operation.

Although the embodiments of the present disclosure have been described with reference to preferred embodiments, workers skilled in the art will recognize that changes may be made in form and detail without departing from the spirit and scope of the present disclosure.

What is claimed is:

1. A method comprising:
   buffering read signals from each of a plurality of read transducers of a head in memory for each of a plurality of cross-track positions of the head relative to a data track;
   processing the buffered read signals to establish a quality metric for each of the read signals and at least one combination read signal comprising at least two of the read signals;
   identifying a data recovery cross-track position and a reader configuration comprising one or more of the read transducers, based on the quality metrics; and
   performing a read operation with the head in the data recovery cross-track position using the read signals of the identified reader configuration.

2. The method according to claim 1, wherein processing the buffered read signals comprises processing each read signal with a Single-Input, Single-Output (SISO) finite-input response (FIR) filter.

3. The method according to claim 2, wherein processing the buffered read signals comprises processing two or more of the read signals with a Multiple-Input, Single-Output (MISO) finite-input response (FIR) filter.

4. The method according to claim 3, wherein processing the buffered read signals comprises processing outputs from the SISO FIR and the MISO FIR with a signal detector.

5. The method according to claim 1, wherein performing a data read operation comprises processing a read signal from a single read transducer.

6. The method according to claim 1, wherein the reader configuration identifies at least two of the read transducers, and performing a data read operation comprises processing multiple read signals.

7. The method according to claim 1, wherein:
the data track includes a servo data sector and a user data sector; and
processing the buffered read signals comprises processing the buffered read signals when the head is positioned over the servo data sector.

8. The method according to claim 1, wherein buffering read signals from each of a plurality of read transducers comprising steps of:
adjusting the cross-track position of the head relative to the track;
buffering read signals from each of the plurality of read transducers; and
repeating the adjusting and buffering steps a limited number of times.

9. A method comprising steps of:
adjusting a cross-track position of a head relative to a data track;
buffering read signals from each of a plurality of read transducers supported by the head; and
processing the buffered read signals to establish a quality metric for each read signal and at least one combination read signal comprising at least two of the read signals;
repeating the adjusting, buffering and processing steps a limited number of times;
identifying a data recovery cross-track position and a reader configuration comprising one or more of the read transducers, based on the quality metrics;
performing a read operation with the head in the data recovery cross-track position using the read signals of the identified reader configuration.

10. The method according to claim 9, wherein processing the buffered read signals comprises processing each read signal with a Single-Input, Single-Output (SISO) finite-input response (FIR) filter.

11. The method according to claim 10, wherein processing the buffered read signals comprises processing two or more of the read signals with a Multiple-Input, Single-Output (MISO) finite-input response (FIR) filter.

12. The method according to claim 3, wherein processing the buffered read signals comprises processing outputs from the SISO FIR and the MISO FIR with a signal detector.

13. The method according to claim 9, wherein performing a data read operation comprises processing a read signal from a single read transducer.

14. The method according to claim 9, wherein the reader configuration identifies at least two of the read transducers, and performing a data read operation comprises processing read signals from the identified read transducers.

15. The method according to claim 9, wherein:
the data track includes a servo data sector and a user data sector; and
processing the buffered read signals comprises processing the buffered read signals when the head is positioned over the servo data sector.

16. A device comprising:
a recording medium comprising a plurality of data tracks;
a head comprising a plurality of read transducers; and
processing circuitry configured to:
buffer a read signal from each of the read transducers for each of a plurality of cross-track positions of the head relative to a selected data track;
process the buffered read signals to establish a quality metric for each of the read signals and at least one combination read signal comprising at least two of the read signals;
identify a data recovery cross-track position and a reader configuration comprising one or more of the read transducers, based on the quality metrics;
perform a read operation with the head in the data recovery cross-track position using the read signals of the identified reader configuration.

17. The device according to claim 16, wherein the processing circuitry includes a Single-Input, Single-Output (SISO) finite-input response (FIR) filter that processes the buffered read signals to establish the quality metric for each of the read signals.

18. The device according to claim 17, wherein the processing circuitry includes a Multiple-Input, Single-Output (MISO) finite-input response (FIR) filter that processes two or more of the read signals to establish the quality metric for at least one combination read signal comprising at least two of the read signals.

19. The device according to claim 18, wherein the processing circuitry includes a signal detector that processes outputs from the MISO FIR and the SISO FIR.

20. The device according to claim 16, wherein:
the selected data track includes a servo data sector and a user data sector, and
the processing circuitry is configured to process the buffered read signals when the head is positioned over the servo data sector.

* * * * *